3,464,784
EXTRACTION OF TETRAVALENT VANADIUM VALUES FROM THEIR AQUEOUS SOLUTIONS USING HYDROXAMIC ACIDS
Ronald R. Swanson, New Hope, Minn., assignor to General Mills, Inc., a corporation of Delaware
No Drawing. Filed June 1, 1967, Ser. No. 642,688
Int. Cl. C01g 31/00; C22b 55/00
U.S. Cl. 23—22                                 9 Claims

ABSTRACT OF THE DISCLOSURE

Tetravalent vanadium values are extracted from aqueous solutions by contacting such solutions with a liquid organic phase comprising a water-immiscible organic solvent and a hydroxamic acid containing at least about eight carbon atoms.

---

This invention relates to the process of extracting tetravalent vanadium values from aqueous solutions thereof and more particularly to such a process employing hydroxamic acids.

A number of processes using hydrometallurgy have been proposed for the recovery of vanadium from its ores. In most of these recovery schemes the vanadium is solubilized by treating the ores with strong mineral acids, usually sulfuric or hydrochloric. This solubilizes the vanadium in the tetravalent form. The processes used heretofore have involved the oxidation of the tetravalent vanadium values to the pentavalent form. The pentavalent vanadium has then been recovered from the oxidized leach liquors using various liquid anion exchange systems.

It would be highly desirable to be able to extract the tetravalent vanadium values directly from the aqueous solutions containing same. In this respect, no oxidizing agent would be required to convert the $V^{+4}$ to $V^{+5}$ and thus the overall cost of the process could be reduced. There are usually other oxidizable materials in the solutions containing the tetravalent vanadium and thus enough oxidizing agent must be added to react with such materials in addition to the excess required to insure complete conversion of $V^{+4}$ to $V^{+5}$.

I have now discovered that tetravalent vanadium values can be extracted from their aqueous solutions by contacting such solutions with an organic phase containing hydroxamic acids. The tetravalent vanadium values are transferred to the liquid organic phase and then the organic and aqueous phases are separated by virtue of their immiscibility.

The extractants useful in the process of the present invention exist in two tautomeric forms having the following structural formulae:

I.
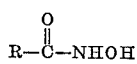

and

II.
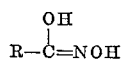

Such tautomeric mixtures are commonly termed simply hydroxamic acids and Formula I is commonly used to represent such mixtures. In a very technical sense, the tautomer of the Formula II is termed a hydroximic acid. As used herein, the term hydroxamic acid means compounds of either Formula I or II above and the tautomeric mixtures thereof.

The hydroxamic acids used in my process contain at least about 8 carbon atoms and may contain up to about 45 carbon atoms and more. Accordingly, the organic radical R contains from about 7 to about 44 carbon atoms and more and preferably from about 7 to about 20 carbon atoms. R may be alkyl, aryl, alkylated aryl, aralkyl, alkenyl, aralkenyl, cycloalkyl, alkylated cycoalkyl and the like. Such organic radical may be substituted with groups such as chlorine, nitro and the like which are inert to the extraction of the tetravalent vanadium values from the aqueous solutions thereof. It is particularly preferred that R is a straight or branched chain alkyl radical. Representative of such alkyl radicals are heptyl, octyl, nonyl, methyloctyl, decyl, hexadecyl, octadecyl, ethyloctadecyl and the like.

The hydroxamic acid extractants can be prepared by known methods such as those set forth in United States Patents 2,397,508 and 2,168,305. Where the hydroxamic acid is sterically hindered, it is preferred to prepare same by the process described and claimed in my copending application Ser. No. 642,690 entitled "Prepartion of Hydroxamic Acids," filed of even date, the disclosure of which is incorporated herein by reference. In general, the process of said copending application involves reacting a sterically hindered acyl halide with a hydroxylamine hydrohalide in the presence of a tertiary amine using a dipolar aprotic solvent. The following example illustrates the preparation of a preferred extractant using such process.

Example A

To a 500 ml. reaction flask equipped with a stirrer, thermometer and an addition funnel were charged 15.6 gm. (0.225 mole) of $NH_2OH \cdot HCl$ dissolved in 200 ml. of dimethylformamide. To this solution 40.5 gm. (0.4 mole) of triethylamine was added over a 12 minute period at 20–25° C. followed by the addition of 31.2 gm. (0.15 mole) of neo-decanoyl chloride over a 12 minute period at 25–30° C. The reaction was continued an additional 30 minutes and then the reaction mixture was poured into one liter of 0.5 M HCl. The product was extracted into ether, washed three times with water, dried over $Na_2SO_4$ and finally the ether was stripped from the product. There was obtained 23.0 gm. of a cream colored solid which was identified by I.R. as neo-decanohydroxamic acid of excellent quality. The starting neo-decanoyl chloride was made from neo-decanoic acid available from Enjay Chemical Company. Neo-decanoic acid has the following general structure

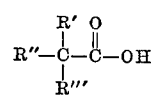

The total number of carbon atoms in the R′, R″ and R‴ alkyl groups averages eight. The said acid is further described in Enjay Technical Bulletin No. D–27 which disclosure is incorporated herein by reference.

In accordance with the present process, the hydroxamic acids are dissolved in a water-immiscible organic solvent prior to the contacting of same with the tetravalent vanadium containing solution. The term "water-immiscible organic solvent" as used herein refers to an organic material normally liquid at ambient temperatures which is substantially, but not necessarily entirely, insoluble in water. The preferred organic solvents for the process of the present invention are the hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents) and the like. Solvents which contain functional groups can also be employed providing that the functional groups do not adversely affect the extraction. Illustrative of such compounds are ketones and esters such as naturally occurring vegetable oils. Chlorinated hydrocarbons such as carbon tetrachloride are also useful in the present process.

Generally, the hydroxamic acid will be present in the organic phase in an amount sufficient to extract at least a portion of the tetravalent vanadium values from the aqueous solutions. Preferably, the hydroxamic acid will be present in an amount of from about 2 to about 50% by weight based on the total organic phase with an amount of from about 2 to 15% by weight being particularly preferred. The hydroxamic acids useful in the process of the present invention are also characterized as having a solubility of at least about 2% by weight in the water-immiscible organic solvent used to make up the organic phase and substantially complete insolubility in water.

The organic phase may also contain other materials such as conditioners—i.e. isodecanol. If a conditioner is present, it will be used in amounts of from about 0.5 to 10 weight percent based on the total organic phase.

The volume phase ratio of the aqueous phase to the organic phase can vary widely depending on the concentrations, conditions, etc. The phase ratio will preferably be in the range of aqueous to organic of about 100:1 to 1:100 and more preferably in the range of about 10:1 to 1:10. The phase ratio and concentration of the hydroxamic acid will, of course, be adjusted so that at least a portion of the tetravalent vanadium values are transferred from the aqueous phase to the organic phase during the contacting step. Ideally, all or substantially all of such tetravalent vanadium values will be transferred leaving a vanadium barren aqueous phase. The aqueous and organic phases are preferably agitated during the contacting step. The extraction can be carried out at a wide variety of temperatures—from the freezing point of the aqueous solution to the boiling point and even above where the process is performed under pressure. The phases must, however, remain liquid and ambient temperatures are entirely suitable and preferred.

After the contacting step, the organic and aqueous phases are separated by virtue of their immiscibility, such as by decantation, the use of separatory funnels and the like.

If desired, the tetravalent vanadium values can be recovered from the loaded organic phase. One method of accomplishing this is to contact the organic phase with an aqueous solution of a relatively strong oxidizing agent, such as sodium peroxide. The tetravalent vanadium which is concentrated in the organic phase is thus oxidized to the pentavalent form and transferred to the aqueous stripping medium. The pentavalent vanadium values can then be recovered from the stripping medium such as by evaporation. $V_2O_5$ is particularly useful in the production of ferrovanadium alloys which are used to improve the ductility of steel.

The invention is further described by the following examples. Said examples are illustrative only and do not constitute limitations on the invention.

EXAMPLE I

Twenty five ml. of green acid (crude wet process phosphoric acid) containing 2.18 gm./l. $V^{+4}$ was shaken for two minutes at ambient room temperature in a separatory funnel with 25 ml. of a solution of 5 gm. of neo-decanohydroxamic acid as prepared in Example A made to 100 ml. with Panasol AN–1. The phases were allowed to separate and then the aqueous layer was withdrawn and analyzed for tetravalent vanadium. It was found to contain 0.135 gm./l. Accordingly, 94% of the $V^{+4}$ was extracted.

EXAMPLE II

Example I was repeated except that the organic phase also contained isodecanol as a conditioner (5 gm. isodecanol and 5 gm. of the neo-decanohydroxamic acid made to 100 ml. with Panasol AN–1). Ninety two percent of the tetravalent vanadium was extracted.

EXAMPLE III

Example I was essentially repeated except that (1) the aqueous solution was prepared by dissolving 10.0 gm. of $VOSO_4 \cdot H_2O$ in one liter of water and adjusting the pH to 1.0 with an 85% by weight aqueous solution of $H_3PO_4$, (2) the organic phase was a 5% by weight solution of neo-decanohydroxamic acid in kerosene, and (3) the aqueous to organic phase ratio was 5:1. The aqueous phase initially contained about 1.88 gm./l. $V^{+4}$ and after the extraction step analyzed 1.41 gm./l. indicating that even at the 5:1 phase ratio 25% of the $V^{+4}$ was extracted. The organic phase analyzed 2.35 gm./l. $V^{+5}$. Twenty five ml. of the loaded organic phase was shaken at ambient temperature for two minutes with 25 ml. of 0.23 M aqueous $Na_2O_2$. The phases were separated and the aqueous phase analyzed for $V^{+5}$. It was found to contain 1.96 gm./l. $V^{+5}$ (as $V_2O_5$). Thus 83.5% of the vanadium values were stripped from the organic phase.

EXAMPLE IV

Examples I–III are repeated using sterohydroxamic acid in place of neo-decanohydroxamic acid. Similar good extraction results are obtained. Sterohydroxamic acid has the structural formula:

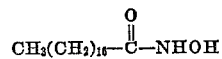

The process of the present invention can be used to extract tetravalent vanadium values from aqueous solutions obtained from any source. But it is particularly valuable for the extraction of such values from acid leach liquors such as those obtained in the acid leaching of phosphate ores.

It is to be understood that the invention is not to be limited to the exact details of operation or the exact processes shown and described, as obvious modifications and equivalents will be apparent to those skilled in the art and the invention is to be limited only by the scope of the appended claims.

The embodiments of the invention in which an exclusive property or privilege is claimed are defined as follows:

1. A process for extracting tetravalent vanadium values from an aqueous solution thereof comprising: (1) contacting said aqueous solution with a liquid organic phase comprising a water-immiscible organic solvent and a hydroxamic acid containing at least about 8 carbon atoms to extract at least a portion of the tetravalent vanadium values into the organic phase and (2) separating the resultant tetravalent vanadium containing organic phase from the aqueous phase, said acid having the structural formula

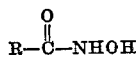

where R is an organic radical containing at least about 7 carbon atoms.

2. The process of claim 1 wherein R is an alkyl radical.

3. The process of claim 2 wherein R contains from about 7 to about 20 carbon atoms.

4. The process of claim 1 wherein the hydroxamic acid is neo-decanohydroxamic acid.

5. The process of claim 1 wherein the hydroxamic acid is sterohydroxamic acid.

6. The process of claim 1 wherein the volume phase ratio of the aqueous phase to the organic phase is in the range of about 100:1 to 1:100.

7. The process of claim 1 wherein the water-immisible organic solvent is a liquid hydrocarbon and the hydroxamic acid is used in an amount of about 2 to 50% by weight based on the organic phase.

8. The process of claim 1 wherein the water-immiscible organic solvent is a liquid hydrocarbon, the hydroxamic acid is neo-decanohydroxamic acid, the neo-decanohydroxamic acid issued in an amount of about 2 to 15% by weight based on the organic phase, and the volume phase ratio of the aqueous phase to the organic phase is in the range of about 10:1 to 1:10.

9. The process of claim 1 wherein the separated tetravalent vanadium containing organic phase is (3) contacted with an aqueous solution of sodium peroxide to strip at least a portion of the vanadium values from the organic phase.

References Cited

UNITED STATES PATENTS

| | | | |
|---|---|---|---|
| 2,909,542 | 10/1959 | Soloway | 23—22 X |
| 3,088,798 | 5/1963 | Fetscher | 75—121 X |
| 3,224,873 | 12/1965 | Swanson | 75—117 X |
| 3,276,863 | 10/1966 | Drobnick et al. | 75—108 X |
| 3,284,501 | 11/1966 | Swanson | 75—117 X |

OTHER REFERENCES

Dutta: "Journal of Indian Chemical Soc.," vol. 35, No. 4, 1958, pp. 243–250.

Dutta: "Journal of Indian Chemical Soc.," vol. 36, No. 5, 1959, pp. 339–345.

Dutta et al.: "Journal of Indian Chemical Soc.," vol. 39, No. 12, 1962, pp. 860–870.

HERBERT T. CARTER, Primary Examiner

U.S. Cl. X.R.

23—23, 140; 75—97, 121